C. R. STENBERG.
ANIMAL TRAP.
APPLICATION FILED NOV. 10, 1921.

1,434,163.

Patented Oct. 31, 1922.
3 SHEETS—SHEET 1.

Charles R. Stenberg
INVENTOR

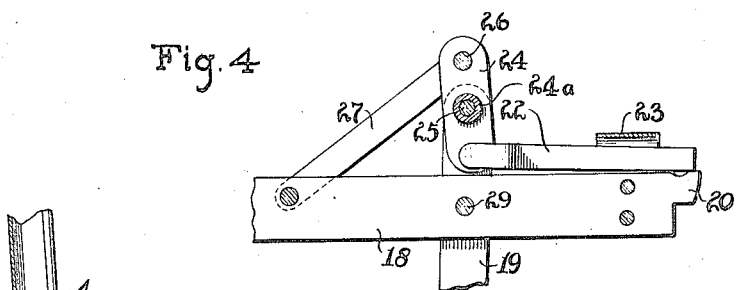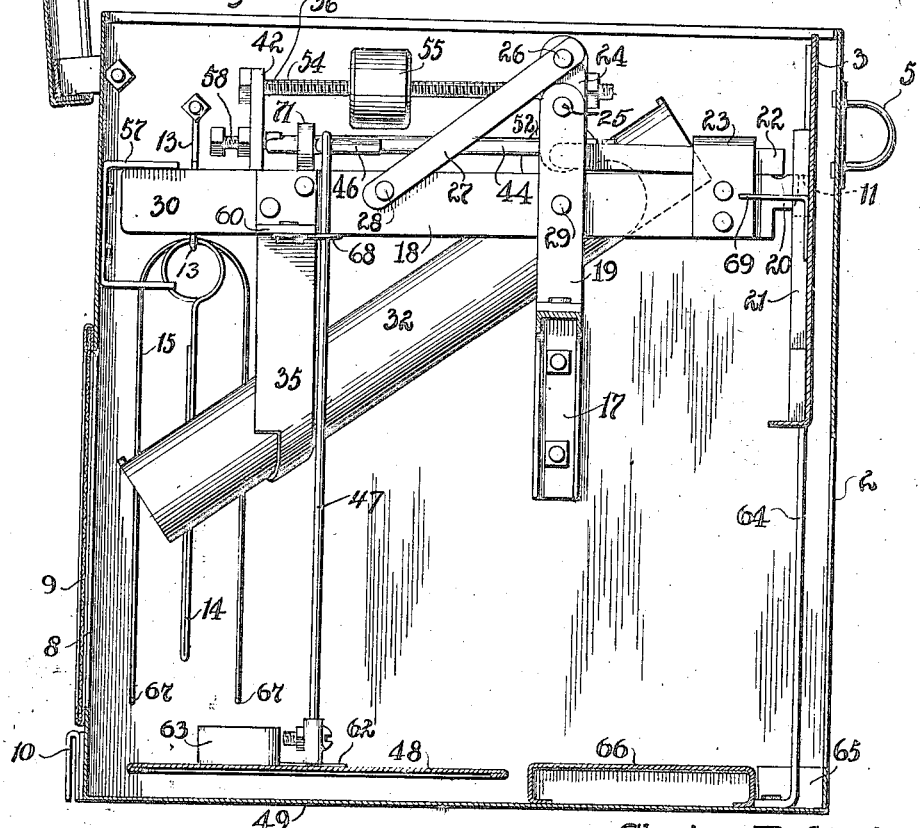

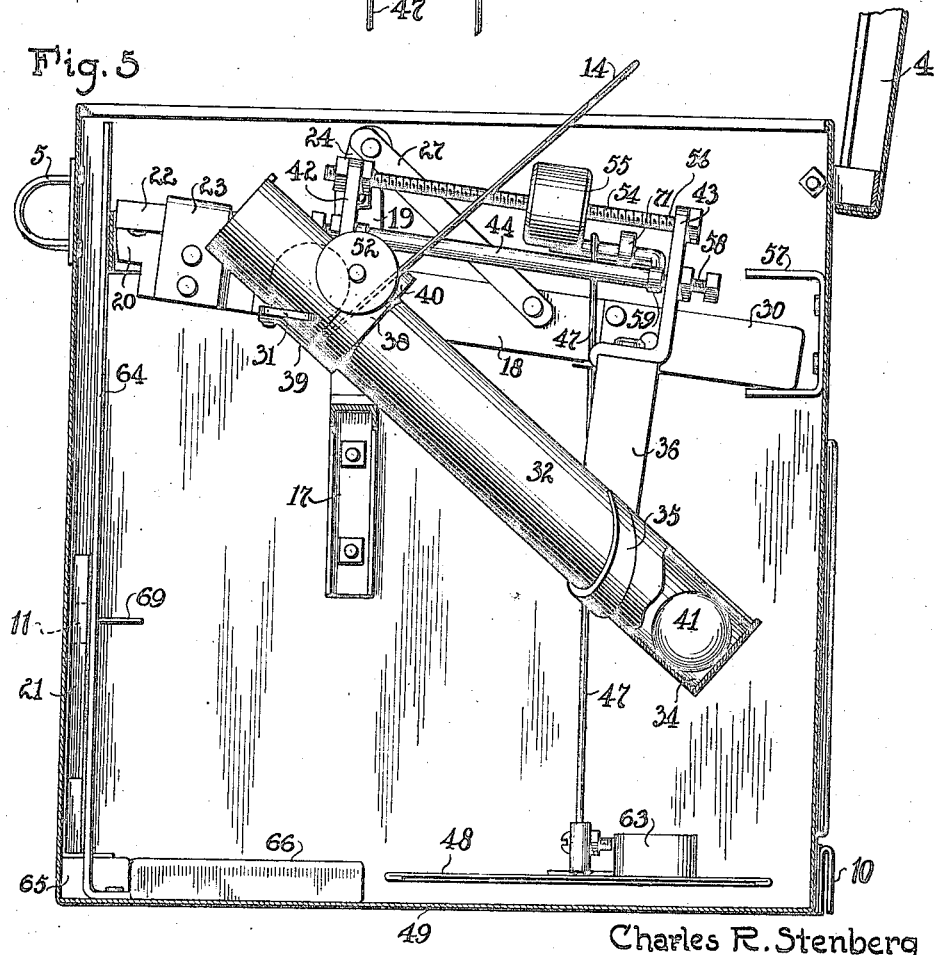

Patented Oct. 31, 1922.

1,434,163

UNITED STATES PATENT OFFICE.

CHARLES ROBERT STENBERG, OF GENOA, NEBRASKA.

ANIMAL TRAP.

Application filed November 10, 1921. Serial No. 514,343.

*To all whom it may concern:*

Be it known that I, CHARLES R. STENBERG, a citizen of the United States, residing at Genoa, in the county of Nance and State of Nebraska, have invented a new and useful Animal Trap, of which the following is a specification.

This invention relates to traps, and has for its object to provide a new and improved mechanism for rapidly closing the gate or door of an enclosure, and which mechanism may be so adjusted that it will be responsive to pressure and therefore operated by animals of different sizes, thus obviating the necessity of providing larger or smaller traps for animals that are within certain limits of weight or size. The size of the trap of course depends largely upon the size of the animal to be trapped. While the operating mechanism of one trap may be nicely adjusted so that it will be operated by mice as well as rats, yet traps of various sizes may be made to accommodate weasels, minks, or mountain lions and bears.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 3 is a vertical section taken along the line 3—3 of Fig. 2.

Fig. 4 is a fragmentary view in detail of the trip mechanism for disengaging the door from its elevated position.

Fig. 5 is a vertical section taken along the line 5—5 of Fig. 2.

Fig. 6 is a fragmentary view in elevation of the pivotal mounting of the supporting frame.

Figure 1:
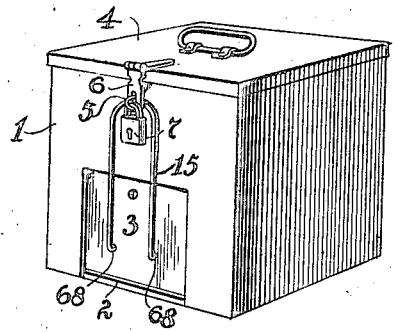
Fig. 1 is a view in perspective of the trap in closed position.
Figure 2:
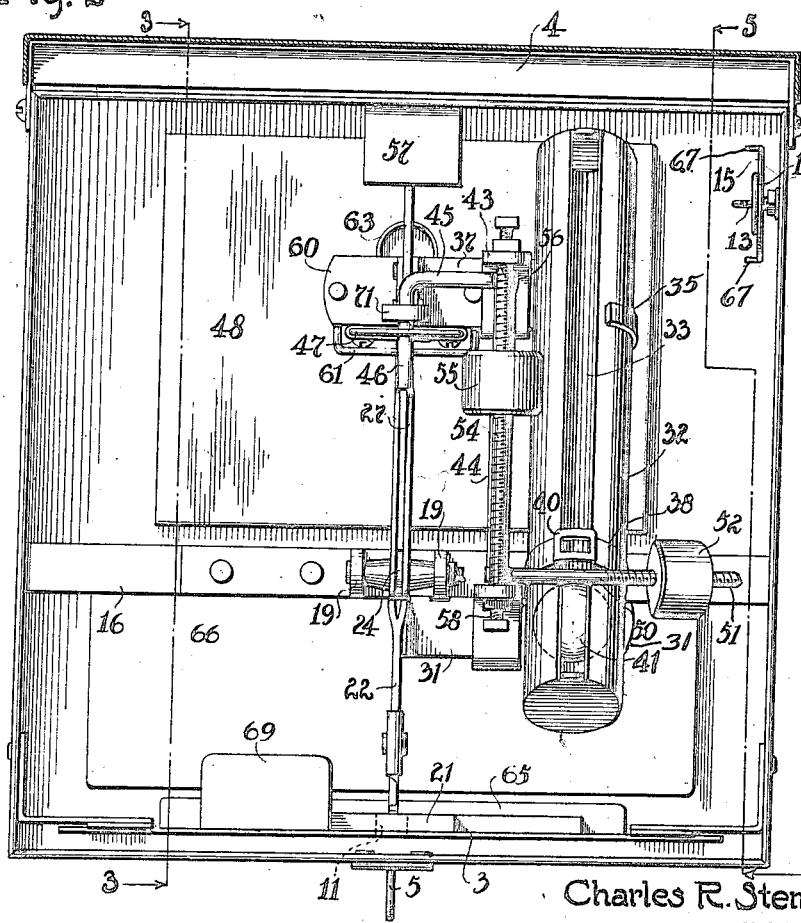
Fig. 2 is a plan view of the trap on a larger scale with the top removed.

Referring to the drawings, 1 designates a casing forming an enclosure for the mechanism and the trapping of animals, and which is provided with an opening 2 adapted to be closed by a door 3. A top cover 4 is pivotally mounted on the casing and is provided with a keeper 5, and a hinged latching member 6 for maintaining the cover in locked position upon the top of the enclosure by means of the lock 7. At the rear of the enclosure there is provided an opening 8, which is closed by means of the screen 9 which permits light to be admitted to the interior of the enclosure 1. Hooks 10 are mounted upon the lower portion of the back of the casing and are adapted to engage a bar located upon a chicken house. The casing 1 is placed with its back against the side of the chicken coop so that the opening 8 will register with an opening in the chicken coop, the hooks 10 engaging the bar on the coop to secure the trap against removal. When the door 3 is open, an animal peering in through this door will be able to see through the opening 8 and the opening in the coop and thereby be attracted by the poultry within the coop, but the screen 9 will prevent the animal caught in the trap from entering the coop.

A hook 13 mounted upon the inner side of the casing 1, provides a support for a key 14 and a lifter 15, the object of which will be presently explained.

A channel-shaped bracket 16 has downwardly turned ends 17 secured to the inner sides of the casing 1, and is adapted to support a pivotally mounted frame somewhat elevated from the floor of the casing. The frame comprises a beam 18 pivotally mounted at 29 on the upstanding arms of the L-shaped members or standards 19 which are secured to the bracket 16. The front end of the beam is provided with a projecting lip 20 which is adapted to be inserted within an opening 11 formed in the upper end of a T-shaped weight 21, which is secured to the inner portion of the door 3, for causing the door to rapidly fall when released from the lip 20. A pusher rod or plunger 22 is slidably mounted on the upper edge of the beam 18, and held in place by a U-shaped member 23 providing a guide for the pusher rod 22. The other end of the pusher rod is pivoted to the lower end of a rocker arm 24 which has an integrally mounted sleeve 24ª rotatable upon a shaft 25 secured in position in the upper ends of the standards 19 above the pivotal point 29 of the beam 18. The upper end of the rocker arm is pivotally connected, at 26, to links 27, the other end of the links being pivotally connected, at 28, to a point on the beam 18 which is remote from the pivotal point of the beam. As the beam 18 is moved upon its pivotal point 29 by depressing the inner end 30, the links 27 will cause the upper end of the rocker arm to move rearwardly, while the lower end will be moved forwardly, carrying the pusher rod or plunger 22 likewise forwardly and driving the door 3 off the lip 20.

Extending laterally and secured to the beam 18 is a bracket 31 having a cut-out portion near its free end, in which is seated a cylindrical race track 32 having a slot 33 in its upper surface extending the entire length of the cylinder. The race 32 is tilted at an angle to the horizontal, the lower end 34 of the cylindrical track depending below the beam 18 and near to the floor 49 of the casing 1, and is seated within a hook-shaped vertical bracket 35 having a vertical arm 36 and a horizontal arm 37 secured to the inner end 30 of the pivoted beam 18. The upper end of the track 32 is provided with a securing band 38 which has a tongue 39 integrally formed with the bottom of the band and riveted or welded to the bracket 31 for securing the upper end of the track 32 to the bracket 31. The portion of the band which bridges the s'ot 33 in the track 32 is provided with a slotted offset portion 40, within which slot is adapted to be inserted the key 14 for temporarily holding a ball 41 in the upper elevated end of the track 32.

A bracket 42 mounted on the lateral arm 31, and a bracket 43 mounted upon the horizontal arm 37 of the bracket 35, are provided with journals for the rotatable shaft 44. The shaft 44 is provided with journals comprising the pivot pins 58 adjustably mounted in the brackets 42 and 43, the inner end of the pivot pins engaging sockets 59 on the ends of the shaft 44. This is but one form of the journal that may be used, and any approved type may be equally well adapted for the purpose. The shaft 44 has a crank arm 45 provided with a return bent portion 46, which is parallel to the shaft 44, and which is adapted to support a strap 47 that carries the depressible platform 48 and maintains the platform elevated above the floor 49.

Upon the other end of the shaft 44 is mounted a laterally extending arm 50, having the screw-threaded portion 51, upon which is adapted to be screwed the adjustable member 52. The arm 50 is normally maintained within slots 53 located transversely of the track 32, so that as the arm 50 rests in the slot, it will engage the ball 41 and maintain the ball in its elevated position in the upper end of the track 32 and upon one side of the pivotal point of the beam 18. When any pressure or weight is applied to the platform 48, the arm 46 will be depressed, rotating the shaft 44 and elevating the arm 50, thereby releasing the same from its engagement with the ball 41, thus permitting the ball 41 to race rapidly down towards the bottom 34 of the tubular race 32. The change of position of the ball upon the other side of the pivotal point of the beam 18, places greater weight upon the inner end 30 of the beam 18, causing the beam 18 to tilt.

The member 52 comprises an adjustable means or weight which may be moved near or away from the end of the arm 50, and thereby respectively increase or decrease the responsiveness of the platform 48 to pressure or weight for depressing the same. The further away the weight 52 is from the free end of the arm 50, the less pressure or weight is needed for depressing the platform 48 to operate the shaft 44, and the nearer the weight 52 is to the end of the arm 50 the greater the weight is required for causing the platform to descend to operate the shaft 44.

Mounted in the upper end of the brackets 42 and 43 is a screw-threaded member 54, upon which is slidably and rotatably mounted a weight 55 engaging the threads of the threaded member 54, so that when the weight 54 is rotated it will move further away from or nearer to the inner end 56 of the screw-threaded member 54. As the member 55 is moved nearer to the end 56 of the screw 54, the beam 18 will have a tendency to tilt more rapidly on its pivot point, but as the rotatable member 55 is moved away from the outer end 56 of the screw 54, the member 18 will be less responsive to its tilting action since the center of gravity of the pivoted arm is somewhat displaced and moved nearer to the pivot point of the frame. The change in position of the weight 55 is effected to counterbalance a variation in the weight of the door 3.

The rear end 30 of the pivoted beam 18 is limited in its movement by the U-shaped member 57, which is adapted to engage said end in its upward or downward movement. The U-shaped stop 57 is secured to the back of the casing 1.

Extending laterally from the rear end 30 of the pivoted beam 18 is an L-shaped bracket 60. A U-shaped guide 61 having its ends secured to the brackets 37 and 60 is adapted to form a guide for the straps 47. The lower ends of the straps are secured in any approved manner to an L-shaped bracket 62, which is secured to the platform 48 and provides a fastening means for the lower end of the U-shaped strap 47. To the rear of the bracket 62 is a pan 63 mounted on the platform for containing bait to attract the animals when necessary.

The door is slidably mounted in guides 64 secured to the bottom 49 of the casing 1. A bumper 65 is secured to the floor of the casing and beneath the door 3, so that as the door falls by gravity when released from the lip 20 of the beam 18, it will strike the same and prevent too great a jar to the apparatus. A platform 66 is secured to the floor 49 between the door and the movable platform 48 so that as the animal passes through the door, it will step upon this platform and be sufficiently elevated, so that its next step will place its forefeet upon the moving platform to depress the same and likewise the arm 46 to rotate the shaft 44 for operating the releasing arm 50.

The lifter 15 has outwardly projecting fingers 67, which are adapted to be inserted in perforations 68 formed in the door 3, and it is only used when the trap or casing 1 has been placed in such a position that the opening at the door will aline with an opening in another box in which it is desired to cage the animal which has been caught in the trap. The lifter then is drawn upwardly, raising the door. This means for opening the door places the operator's hands out of range of being bitten by the animal.

The operation of my device is as follows:—

The key 14 is inserted in the slot 33 of the track 32 between the ball 41 and the lower end of the cylindrical members, when the ball is located in its lowermost position, as shown in Fig. 5. The ball is then moved upwardly until it passes beyond the arm 50, when the key may be placed within the slot located in the offset portion 40 of the binding strap 38 and there aid in maintaining the ball temporarily in its elevated position until the trap is set, when the same may be removed. The lip 67 forms a gripping surface by which the door may be raised. The lip 69 is caught by the left hand, while the beam 18 or the lower end of the track 32 is gripped by the right hand and raised, and both the door and the pivoted frame are tilted so that the beam 18 is substantially in a horizontal position, as shown in Fig. 3. The perforation 11 in the door is then engaged by the lip 20 of the beam 18. The tilting of the beam 18 to a horizontal position causes the links 27 to rotate the upper end of the rocker arm 24 forwardly, and cause the pusher bar 22 to be withdrawn from the outer end of the beam and away from the lip 20, in order that the lip 20 may be inserted within the opening 11.

The weight 52 may be moved further from or nearer to the end of the arm 50, depending upon the kind of animal to be caught in the trap. If very small animals are to be caught in the trap, the weight 52 may be moved further away from the end of the arm 50 and nearer the shaft 44, so that the platform 48 will be more sensitive or responsive to a slight pressure. The result of this last adjustment is to cause the weight of the parts supported by and upon opposite sides of the shaft 44 to be equivalent. If a larger animal is to be caught, a less responsive device is required and therefore the weight 52 will be moved outwardly towards the end of the arm 50. Whatever adjustment is necessary, it may be readily had by moving the weight 52 either nearer to or further away from the arm 52.

The trap in this position is set and the key 14 is removed from its socket in the offset portion 40 and replaced upon the hook 13 located on the side of the casing 1. The weight 55 may be adjusted along the screw 54, and is only used to displace the center of gravity of the pivoted frame when the weight of the door requires such an adjustment. As the weight 55 is moved away from the door and towards the end 56 of the screw 54, it will be seen that the pivoted frame will be more responsive to tilting when the ball 41 races down the inclined track 32 and strikes the bottom 34 of the track. If a lighter door is used, the weight 55 may be rotated and moved away from the end 56 of the screw 54 until the proper adjustment is had for balancing the weight of the door 3.

The trap is usually placed with the screen 9 alining with an opening in a chicken coop, so that as an animal approaches the coop, it will apparently find an entrance through the open door 3, since he is able to see through this door and through the screen 9 into the coop. As he moves forwardly and places one or both of his forefeet upon the platform 48, allowing his weight to fall on the platform, the slight pressure exerted by the animal will be sufficient to depress the platform 48, the straps 47, and the arm 46, thereby rotating the shaft 44 and elevating the arm 50, when the weight 41 will be released from its elevated position and race down the track 32, thereby displacing the center of gravity of the pivoted frame and cause the rear end of the beam 18 to be tilted downwardly. As the beam 18 is tilted downwardly in the same direction with the depressed platform 48, the forward end of the beam which is provided with a lip 20 will be raised. Links 27 will move the upper end of the rocker arm 24 rearwardly, while the lower end of the rocker arm will be moved forwardly and carry the pusher rod 22 likewise forwardly and force the door 33 off the lip 20, when it will drop by gravity, by reason of the added weights 21, and be guided in its downward movement upon the wooden bumper 65, by the members 64. The members 64 maintain the door in closing relation with the opening 2.

What is claimed is:—

1. A trap comprising an enclosure having an opening, a gravity-operated door for said opening, a pivotally mounted frame provided with a support for suspending the door in an elevated position, a plunger on the frame for driving the suspended door off the support of the frame, and means for operating the plunger.

2. A trap, comprising an enclosure having an opening, a gravity operated door for said opening, a pivotally mounted frame supporting the door in elevated position, a shaft rotatably mounted on the frame and provided with crank arms, a platform supported by one of the arms and adapted when depressed to move the arm and rotate the shaft, the other arm being operated by the shaft for causing the center of gravity of the pivoted frame to be shifted, and thereby causing the frame to tilt on its pivot, and means operated by the tilting of the frame for positively disengaging the door from the frame.

3. A trap, comprising an enclosure having an opening, a gravity operated door for said opening, a pivotally mounted frame supporting the door in elevated position, a ball race mounted on the frame, a weight shiftable in the race upon opposite sides of the pivotal point of the frame, a shaft rotatably mounted on the frame and provided with crank arms, a platform supported by one of the arms and adapted when depressed to rotate the shaft and move the other arm, said second arm adapted to maintain the weight upon one side of the pivotal point of the frame and when operated by the shaft to release the weight for movement in the race whereby said weight is shifted to the other side of the pivotal point of the frame and thereby causing the frame to tilt on its pivot, and means operated by the tilting of the frame for positively disengaging the door from the frame.

4. A trap comprising an enclosure having an opening, a gravity operated door for said opening, a pivotally mounted frame supporting the door in elevated position, a platform supported by the frame, means operated when the platform is depressed to displace the center of gravity of the pivoted frame and thereby cause the frame to tilt on its pivot, and means operated by the tilting of the frame for positively disengaging the door from the frame.

5. A trap comprising an enclosure having an opening, a gravity operated door for said opening, a pivotally mounted frame supporting the door in elevated position, means responsive to pressure for tilting the frame, means for varying the responsiveness of the operating means to pressure, and means operated by the tilting of the frame for positively disengaging the door from the frame.

6. A trap comprising an enclosure having an opening, a gravity operated door for said opening, a pivotally mounted frame supporting the door in elevated position, a race mounted on the frame, a weight shiftable in the race, means for maintaining the weight upon one side of the pivotal point of the frame, means responsive to pressure for releasing the weight to change the position of the same relative to the pivotal point of the frame to tilt said frame, and means operated by the tilting of the frame for positively disengaging the door from the frame.

7. A trap comprising an enclosure having an opening, a gravity operated door for said opening, a pivotally mounted frame supporting the door in elevated position, a race mounted on the frame, a weight shiftable in the race, means for maintaining the weight upon one side of the pivotal point of the frame, means responsive to pressure for releasing the weight to change the position of the same relative to the pivotal point of the frame to tilt said frame, means for varying the responsiveness of the device to pressure, and means operated by the tilting of the frame for positively disengaging the door from the frame.

8. A trap comprising an enclosure having an opening, a gravity operated door for said opening, a pivotally mounted frame supporting the door in elevated position, a shaft rotatably mounted on the frame and provided with a crank arm, a platform supported upon said arm and adapted when depressed to rotate the shaft, a race mounted upon the frame and extending upon opposite sides of the pivotal point of the frame, a ball shiftable in the race, a keeper maintaining the ball in an elevated position in the race and adapted to release said ball when the platform is depressed, and means on the keeper for varying the responsiveness of the platform to pressure, said ball when depressed in the lower part of the race adapted to cause the frame to tilt, and means operated by the tilting of the frame for positively disengaging the door from the frame.

9. A trap comprising an enclosure having an opening, a gravity operated door for said opening, a pivotally mounted frame supporting the door in elevated position, means for tilting the frame, and a pusher rod slidably mounted on the frame and adapted to be operated by the tilting of the frame for disengaging the door from the frame.

10. A trap comprising an enclosure having an opening, a gravity operated door for said opening, a pivotally mounted frame for supporting the door in elevated position, means for tilting the frame, a pusher rod slidably mounted on the frame, a rocker arm connected with the pusher rod, and a link connected to the frame and to the rocker arm for operating the pusher rod to disengage the door from the frame when said frame is tilted.

11. A trap comprising an enclosure having an opening, a gravity operated door for said opening, a pivotally mounted frame supporting the door in elevated position, means shiftable from opposite sides of the pivotal point of the frame for tilting the frame means for displacing said shiftable means, and means operated by the tilting of the frame for positively disengaging the door from the frame.

12. A trap comprising an enclosure having an opening, a gravity operated door for said opening, a pivotally mounted frame for supporting the door in elevated position, a shaft rotatably mounted on the frame and provided with a crank arm, a platform responsive to pressure for operating the crank to rotate the shaft, a weight shiftable upon opposite sides of the pivotal point of the frame, means operated by the shaft for maintaining the last named means upon one side of the pivotal point of the frame and adapted, when operated, to permit the said means to move to the opposite side of the pivotal point to tilt the frame, and means operated by the tilting of the frame for positively disengaging the door from the frame.

13. A trap comprising an enclosure having an opening, a gravity operated door for said opening, a pivotally mounted frame supporting the door in elevated position, a ball movable in a track for tilting the frame, said ball adapted to be supported in the upper part of the track, a releasing means for the ball, means responsive to pressure for tripping the releasing means, and means for adjusting the releasing means to cause the same to be responsive to varying pressures.

14. A trap comprising an enclosure having an opening, a gravity impelled closure for said opening, a pivoted beam supporting the closure in elevated position, means for tilting the beam, and a push rod operated by the tilting of the beam for forcing the closure from the supported position on the beam.

15. A trap comprising an enclosure having an opening, a gravity impelled closure for the opening, a pivoted beam supporting the closure in elevated position, means for tilting the beam, means adjustable along the beam for varying the responsiveness of the beam to tilting for counterbalancing the varying weights of the door closure, and a push rod operated by the tilting of the beam for forcing the door from its supported position on the beam.

16. A trap comprising an enclosure having an opening, a gravity-operated door for said opening, a pivotally mounted frame provided with a support engaging the door for suspending the door in elevated position, a gravity-operated means locked in an elevated position upon one side of the pivotal point of the frame and adapted to tilt the frame when released, means responsive to pressure for releasing the gravity-operated means from its locked position, said means when released being projected upon the opposite side of the pivotal point and tilting the frame, and means actuated by the tilting of the frame for driving the door off its support on the frame.

17. A trap comprising an enclosure having an opening, a gravity operated door for said opening, a pivotally mounted frame supporting the door in elevated position, a gravity operated means on the beam adapted to tilt the beam, means responsive to pressure for retaining the gravity operated means upon one side of the pivotal point of the frame, said means when released permitting the gravity operated means to be projected upon the opposite side of the pivotal point and tilt the frame, and an adjustable means for causing the retaining means to be responsive to varying pressures.

18. A trap comprising a casing having an opening, a gravity impelled closure for the opening, a pivoted beam supporting the opening, a pivoted beam supporting the closure in elevated position, means for tilting the beam, a push rod slidably mounted on the beam, a rocker arm pivotally connected with the push rod, and links connected with the rocker arm and with the beam for operating the push rod for forcing the door from its supported position on the beam when said beam is tilted.

19. A strip comprising a casing having an opening, a gravity impelled closure for the opening, a pivotally mounted frame supporting the closure in elevated position, a shaft rotatably mounted on the frame, a track provided with a ball shiftable on said track and upon opposite sides of the pivotal point of the frame, means operated by the shaft for retaining the ball in the upper end of the track and upon one side of the pivotal point of the frame, a crank arm for rotating the shaft, and means responsive to pressure for operating the shaft to release the retaining means to permit the ball to shift the center of gravity of the pivoted frame and thereby tilt the frame and eject the door from its supported position on the frame.

20. A trap comprising a casing having an opening, a gravity impelled closure for the opening, a pivoted frame supporting the closure in elevated position, means for tilting the frame, and means operated by the tilting of the frame for forcing the door from its supported position on the frame, and means adjustable longitudinally of the frame for counterbalancing the pivoted frame when doors of different weights are provided.

In testimony that I claim the foregoing as my own, I have hereto affixed my signature.

CHARLES ROBERT STENBERG.